July 3, 1956 F. G. FEKETICS 2,753,390
RADIO SHIELDED ENCLOSURES
Filed Feb. 18, 1952 2 Sheets-Sheet 1
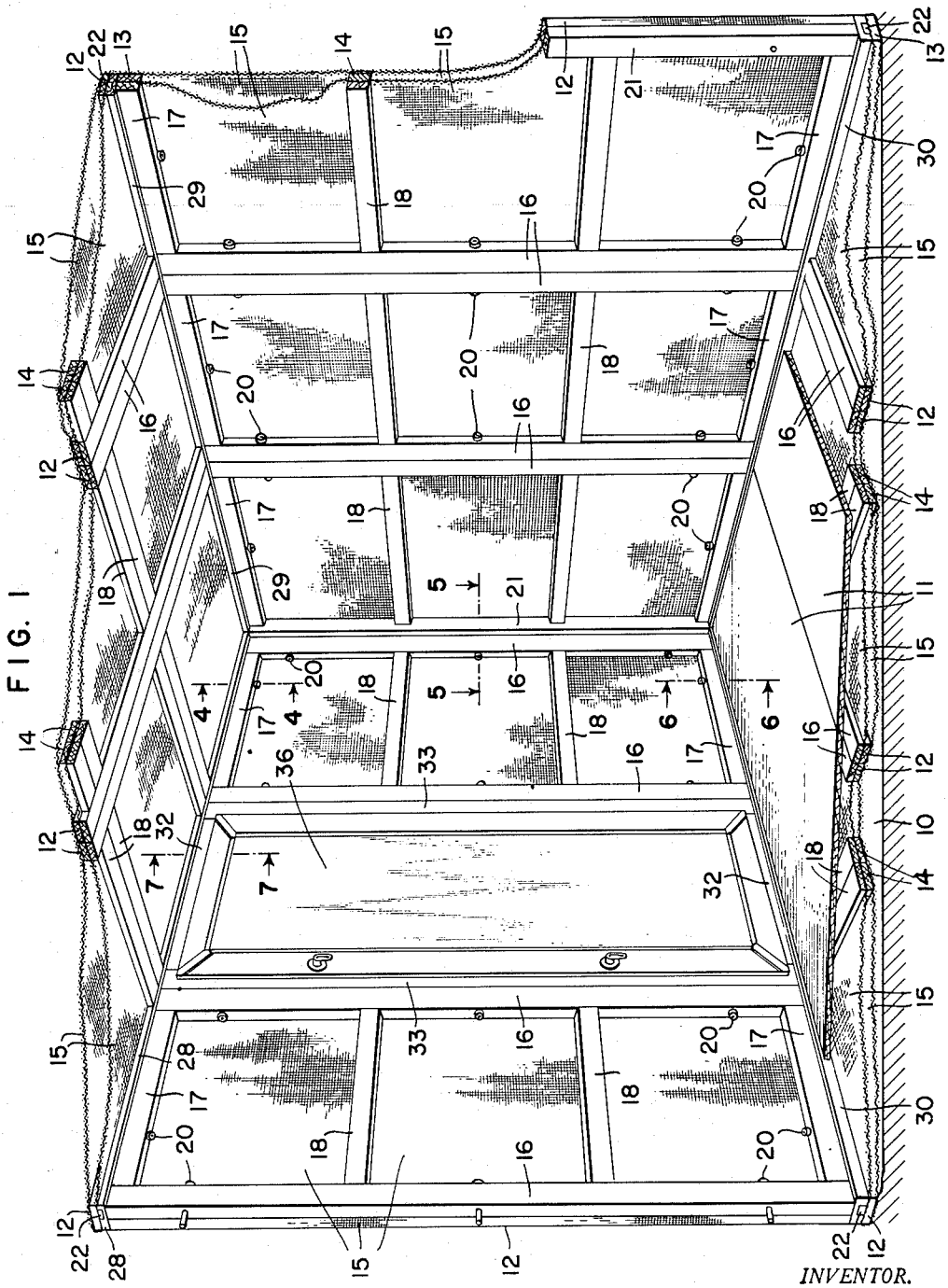
INVENTOR.
FRANK G. FEKETICS
BY
ATTORNEY.

July 3, 1956  F. G. FEKETICS  2,753,390
RADIO SHIELDED ENCLOSURES
Filed Feb. 18, 1952  2 Sheets-Sheet 2
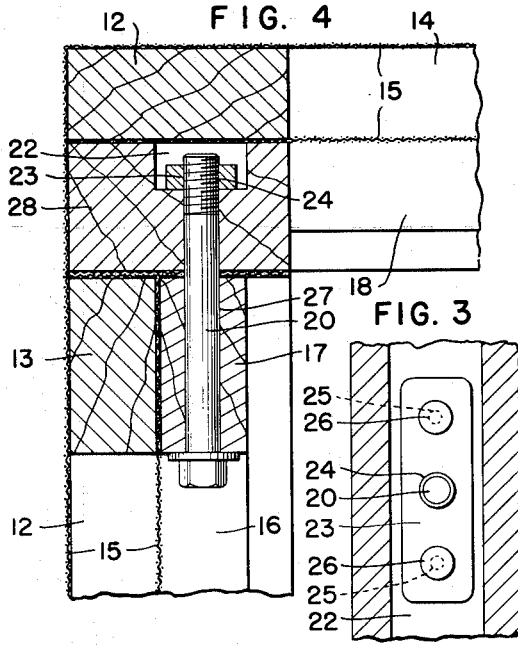
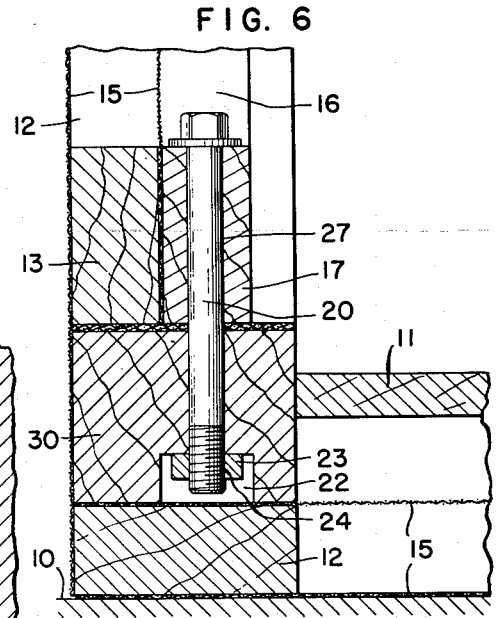
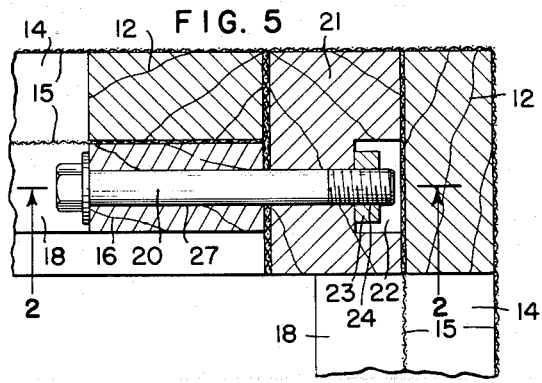
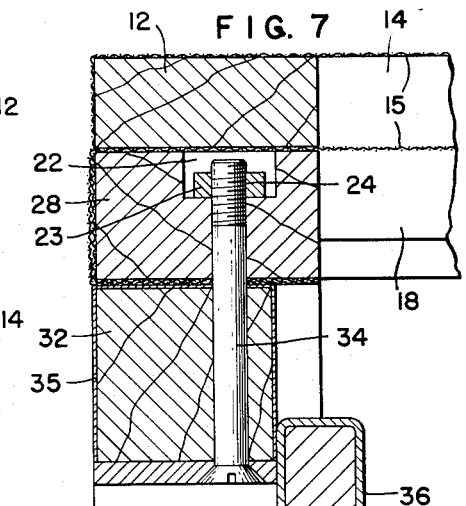
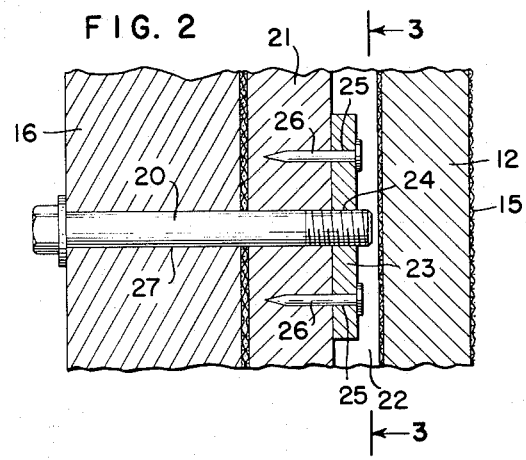
*INVENTOR.*
FRANK G. FEKETICS
ATTORNEY.

United States Patent Office 2,753,390
Patented July 3, 1956

2,753,390

RADIO SHIELDED ENCLOSURES

Frank G. Feketics, Philadelphia, Pa., assignor to Ace Engineering & Machine Co., Inc., Philadelphia, Pa., a corporation of Pennsylvania Application February 18, 1952, Serial No. 272,241

5 Claims. (Cl. 174—35)

This invention relates to radio shielded enclosures, and it relates more particularly to such enclosures made of separable panels, which may be shipped in "knocked-down" form, and secured to each other at the desired location to provide an enclosure the interior of which will be shielded against stray radio waves, and in which testing of various electrical instruments may be done without interference from such waves which otherwise would seriously affect the accuracy of the measurements and tests.

Such shielded enclosures are used in laboratories and other places where various types of tests are performed such, for example, as radio interference measurements, radio frequency calibration, radio inspection tests, equipment for measuring minute voltages, and other devices and appliance, the purpose of the enclosure being to prevent interference by stray waves by the interception thereof.

Heretofore, in the making of enclosures for the aforesaid purposes of separable panels adapted to be assembled at the site of use, when the same were to be used in relatively small rooms, it was necessary to make the same of such size, relative to the rooms in which they were erected, that the workmen could have access to all parts of the exterior thereof, the bolts in such cases being entirely on the outside of the structure.

When it was attempted to construct a radio shielded enclosure of the character aforesaid, which could be assembled by bolting entirely from the inside, various difficulties occurred principally by reason of the tendency of the bolts to act as antenna which would pick up the stray waves which it was desired to shield against, and to transmit the same to the interior of the enclosure, as well also to accentuate the effect thereof by reradiation thereof within the enclosure.

The principal obect of the present invention is to provide a radio shielded enclosure made of separate screen panels adapted to be assembled and bolted together entirely from the inside.

A further object of the invention is to provide an enclosure of the character aforesaid which will provide shielding properties by means of the assembled panels, to the fullest possible extent.

The nature and characteristic features of the invention will be more readily understood from the following description, taken in connection with the accompanying drawings forming part hereof, in which:

Figure 1 is a perspective view of a portion of a radio shielded room embodying the main features of the present invention, the same being shown interiorly;

Fig. 2 is a fragmentary sectional view of a portion of the structure illustrating the manner of bolting the several panels to each other, at the vertical corner of the structure the section being taken on the line 2—2 of Fig. 5;

Fig. 3 is a sectional view taken on the line 3—3 of Fig. 2, further illustrating the corner bolting arrangement;

Fig. 4 is a vertical section taken approximately on the line 4—4 of Fig. 1, illustrating the manner of securing a ceiling panel to the top of one of the sidewall panels;

Fig. 5 is a horizontal section taken approximately on the line 5—5 of Fig. 1, illustrating the manner of securing the sidewall panels to each other at a vertical corner of the structure;

Fig. 6 is a similar view taken on the line 6—6 of Fig. 1, illustrating the manner of securing sidewall panels to the floor structure; and Fig. 7 is a vertical sectional view taken approximately on the line 7—7 of Fig. 1, illustrating the manner of securing the door frame forming one of the side panels to one of the ceiling panels.

It should, of course, be understood that the description and drawings herein are illustrative merely, and that various modificaitons and changes may be made in the structure disclosed without departing from the spirit of the invention.

Referring to the drawings, in the particular embodiment of the invention therein shown, the sidewalls of the room are made up of a series of vertical panels secured to each other in a manner to be presently explained.

Likewise, the ceiling is made up of a series of horizontally disposed panels resting on and secured, in a manner to be presently explained, to the panels which make up the sidewalls.

Also, the floor is made up of a similar series of screened panels which are placed on the primary floor 10 of the building in which the shielded enclosure is erected.

The screened floor panels have superposed thereon a series of panels 11 preferably made of plywood which rest upon the screen panels, and provide the floor of the enclosure.

Each of the screened panels, whether the same be of the sidewalls, the ceiling, or the screening floor panels, consists primarily of a frame work comprising strips 12 running lengthwise of the panels, connected at their ends by strips 13 running transversely of the panels, and preferably intermediate strips 14 also running transversely of the panel.

All of the strips 12, 13, and 14, above described, are preferably rectangular in cross-section and the joints for connecting the strips to each other may be of any preferred type.

The basic frame work of each of the panels is covered preferably on both sides, with wire screening 15, the fineness of the mesh of which will depend more or less upon the efficiency of the shielding required in each instance. In lieu of the wire screening, thin sheet metal or metal foil may be used.

After the screening has been placed on the basic frame of each panel, as above described, additional strips are secured to the frame on which constitutes the inner face thereof.

With the exception of a certain special type of strip, to be hereinafter described, the strips which are secured to the panels on the inner face thereof, are in each instance preferably rectangular in cross-section, and similar to the strips of the basic frame work to which they are attached, for example, strips 16, running lengthwise of each panel, are secured to the strips 12 of the basic frame which also run lengthwise. Likewise, strips 17 are secured to the strips 13 at each end of the basic frame and strips 18 are secured to the transverse strips 14.

Each of the lengthwise strips 16, as well as the crosswise strips 17 are provided with bolt holes through which ordinary bolts 20 are passed which serve to secure the strips to each other where the panels are joined to complete the sidewalls, ceiling and screened floor structure.

However, at the corners, that is, where the side panels are secured to each other, or where the side panels are secured to the ceiling panels, a somewhat different arrangement is provided in that the strip 21 running lengthwise of one of the panels at the corner abutment which is applied to the basic frame work is somewhat larger in thickness than that of the strips 16, 17 and 18 which are applied to the basic frame of each panel and each of said strips 21 is provided with a longitudinal groove 22 in which there are mounted plate members 23 which have threaded apertures 24 adapted to be engaged by the threaded end of fastening bolts 20.

Each of the plate members 23 is also provided with holes 25 through which the nails 26 may be driven for securing the plate members 23 at the proper position within the longitudinal grooves 22 so that the same will register with the holes 27 in the complemental strips 16 and 17 of the adjacent panel.

Likewise, the screen panels which are used for the ceiling are provided where the side margins of said panels engage the top members of the sidewall panels with strips 28 similar in cross-section to that of the strips 21 used on one of the panels at the corner abutment.

Also, the end of the ceiling panels which are superposed over the sidewalls have, on the edge thereof which engages the top of the sidewall panels, a strip 29 similar in cross-section to that of the strips 21 used at the corner abutments of the sidewall panels.

In each of the grooves 22 provided in the strips 28 at the ends, and the strips 29 at the marginal edges of the ceiling panels adjacent the sidewalls, there are mounted plate members 23 which are so located as to register with the bolts 20 which pass through the strips at the top members 17 of the sidewall panels.

The floor structure is similar to the other portions of the enclosure with certain modifications which will now be explained.

A plurality of screen panels are employed which are laid on the floor 10 of the building in which the enclosure is to be erected, and each of said panels is substantially the same as that of the ceiling panels with the exception that at the sides which are located adjacent the lower ends of the sidewall panels are provided with strips 30 similar to the grooved strips 21 with the exception that they are of greater height in cross-section than the combined thickness of the strips 12 and 16. Also, at the end of the screened floor panels there are provided transverse strips 31, similar to the strips 29 of the ceiling panels. Here again an additional height is provided by making the strips 31 greater than the combined thickness of the strips 12 and 16 of the screened panels.

This additional height is provided to permit the placing, on the screen panels of the floor structure a series of floor panels 11 which preferably are made of plywood of sufficient thickness and strength to serve as a working floor for the enclosure.

In the making of the screened panels, the basic panels are first constructed and covered with the material for intercepting the radio waves which, as heretofore pointed out, is preferably wire screening, although sheet metal or metal foil may be employed for this purpose, if desired.

The screening material is placed on the basic frame before the marginal strips 16 and 17 are mounted thereon, and extend between said strips and the complemental members of the basic frame. However, the screen material extends beyond the ends of the basic frame and is bent around the marginal strips of each panel so that when the panels are secured together in assembled positions, the screening material will extend between the edges of the panels and insure a complete interception without the possibility of leakage of waves therethrough.

In lieu of one of the ordinary side panels a door frame may be inserted which may comprise members 32 and 33 of a thickness equal to the thickness of a completed panel with the internal strips thereon, the arrangement being such that the same may be bolted to the adjacent screen panels by means of the bolts 34 shown, for example, in Fig. 7 of the drawings.

The door frame members will be enclosed by screening material 35, preferably sheet metal, and in like manner, the door will also be made in any preferred manner so long as the same is entirely enclosed with screening material 36, such as sheet metal, and the body portion of the door may be either sheet metal or woven wire.

The manner of erection of the enclosure will be obvious from the foregoing description, as well as a consideration of the drawings, as it is only necessary to bring the various parts together with the bolt holes in register and then place the bolts therethrough. The threaded ends of the bolts 20 are caused to engage the plate members 23 which are initially located in the grooves 22, at the proper places for such purpose.

Where the panels are joined together other than at the corners of the enclosure along the top and bottom edges of the side panels ordinary bolts and nuts may be used, the bolts passing through suitable holes provided in the strips 16.

Whenever it is desirable to use the same, bolts with countersunk heads may be employed, as for example, where the door frame is secured to the adjacent panels, as illustrated in Fig. 7 of the drawings.

I claim:

1. A radio shielded enclosure having a plurality of interconnected double screen panels comprising structural frames, inner and outer screens positioned on the inner and outer sides of said frames, and strips for interconnecting said panels overlying said inner screens and attached to said frames, at least one of said screens of each panel at the corners of said enclosure having a portion extending beyond its panel frame and around the interconnecting strip thereof to a point within said shielded enclosure, said panels being secured to each other at the corners of said enclosure by fastening means engaging said interconnecting strip elements and passing through said screen extensions, said screen extensions being in electrical contact with each other and extending between abutting surfaces of the interconnecting strips of the panels forming said corner and said fastening means being positioned wholly within the shielded enclosure.

2. The radio shielded enclosure of claim 1 further characterized by a threaded member secured to one of said interconnecting strips of one of said panels and a threaded fastening member passing through the interconnecting strip of the adjoining corner panel and engaging said threaded member to hold said corner panels firmly together.

3. A radio shielded enclosure comprising a plurality of interconnected double screen panels comprising a basic framework consisting of structural frame strips, inner and outer metal screens positioned on the inner and outer sides of said frame strips, and strips for interconnecting said panels overlying said inner screens and attached to the inner face of said frame strips, each of said screens of each panel at the corners of said enclosure having a portion extending beyond its respective panel frame and around the interconnecting strip thereof to a position within said shielded enclosure, said panels being secured to each other at the corners of said enclosure by fastening means engaging said interconnecting strips and passing through said screen extensions, said screen extensions being in electrical contact with each other and extending between abutting surfaces of the interconnecting strips of the panels forming said corner, and said fastening means being positioned wholly within said shielded enclosure.

4. A radio shielded enclosure comprising a plurality of panels connected from within said enclosure, each of said panels comprising a basic framework consisting of frame strips entirely covered on each inner and outer face with inner and outer metallic screens and marginal strips for interconnecting said panels overlying said inner screens and secured to the inner face of said frame strips, each of said inner and outer screens at the corners of said enclosure having a portion extending beyond its respective panel frame and around the interconnecting strip thereof to a fastening position within said shielded enclosure, said panels being secured at the corners of said enclosure in an abutting, straight line relationship to each other in which the face of one of said marginal strips on one corner panel is opposed by the edge surface of the marginal strip of the other corner panel with said screen extensions firmly held in electrical contact with each other between the abutting surfaces of said marginal strips, said panels being secured to each other at the corners of said enclosure by fastening means passing through one of said marginal strips, through said screen extensions and into the opposed marginal strip, said fastening means being positioned wholly within the shielded enclosure.

5. The radio shielded enclosure of claim 4 further characterized by a threaded member fixedly secured in the said opposed marginal strip and a threaded bolt engaging said threaded member and passing through said screen extensions, said threaded member and said bolt being positioned wholly within said radio shielded enclosure.

References Cited in the file of this patent

UNITED STATES PATENTS

| | | |
|---|---|---|
| 1,519,627 | Oliver | Dec. 16, 1924 |
| 1,576,730 | Harth | Mar. 16, 1926 |
| 2,120,861 | Hastings | June 14, 1938 |
| 2,405,987 | Arnold | Aug. 20, 1946 |
| 2,578,614 | Sylvan | Dec. 11, 1951 |
| 2,599,944 | Salisbury | June 10, 1952 |

OTHER REFERENCES

Publication I, ARRL Report No. 5–48, "Specification and Design Characteristics for ARRL Screen-Room Model 1A and Lb," U. S. Naval Air Development Center, Johnsville, Pennsylvania, 11 Aug. 1947. (Copies in 174–35.4, Div. 69.)